US006860920B2

(12) United States Patent
Simmons

(10) Patent No.: US 6,860,920 B2
(45) Date of Patent: Mar. 1, 2005

(54) BLOCK POLYESTER-ETHER GAS SEPARATION MEMBRANES

(75) Inventor: John W. Simmons, Wilmington, DE (US)

(73) Assignee: L'Air Liquide-Societe Anoyme a Directoire et Conseil de Surveillance Pour l'Etude et l'Exploitation des Procedes George Claude, Paris (FR)

( * ) Notice: Subject to any disclaimer, the term of this patent is extended or adjusted under 35 U.S.C. 154(b) by 0 days.

(21) Appl. No.: 10/388,970

(22) Filed: Mar. 13, 2003

(65) Prior Publication Data

US 2004/0025689 A1 Feb. 12, 2004

Related U.S. Application Data

(60) Provisional application No. 60/368,471, filed on Mar. 28, 2002.

(51) Int. Cl.[7] .................. B01D 53/22; B01D 71/48; B01D 71/52
(52) U.S. Cl. .................. 95/49; 95/51; 95/52; 96/4; 96/7; 96/13; 96/14
(58) Field of Search .................. 95/45, 49, 51, 95/52; 96/4, 7, 11–14

(56) References Cited

U.S. PATENT DOCUMENTS

| | | | | |
|---|---|---|---|---|
| 3,822,202 A | * | 7/1974 | Hoehn | 95/55 |
| 4,613,440 A | * | 9/1986 | Zupancic et al. | 210/490 |
| 4,636,229 A | * | 1/1987 | Itoh et al. | 96/14 |
| 4,745,142 A | * | 5/1988 | Ohwaki et al. | 524/87 |
| 4,963,165 A |   | 10/1990 | Blume et al. | |
| 4,994,095 A | * | 2/1991 | Kawakami et al. | 95/51 |
| 5,034,034 A | * | 7/1991 | Sanders et al. | 96/10 |
| 5,085,676 A |   | 2/1992 | Ekiner et al. | |
| 5,209,848 A | * | 5/1993 | Jeanes et al. | 210/490 |
| 5,352,273 A | * | 10/1994 | Simmons et al. | 95/45 |
| 5,393,323 A | * | 2/1995 | Simmons | 95/45 |
| 5,393,324 A | * | 2/1995 | Simmons | 95/45 |
| 5,474,596 A | * | 12/1995 | Simmons | 95/45 |
| 5,611,843 A |   | 3/1997 | Ho | |
| 5,814,127 A | * | 9/1998 | Li | 95/47 |
| 5,820,992 A | * | 10/1998 | Jadhav et al. | 428/447 |
| 5,969,082 A | * | 10/1999 | Kuwahara et al. | 528/171 |
| 6,168,653 B1 | * | 1/2001 | Myers | 96/4 |
| 6,387,994 B1 | * | 5/2002 | Gore et al. | 524/198 |
| 6,425,936 B1 | * | 7/2002 | Sammons et al. | 95/45 |

FOREIGN PATENT DOCUMENTS

| | | |
|---|---|---|
| DE | 196 31 841 A | 2/1998 |
| EP | 0 781 795 A | 7/1997 |
| WO | WO 00 76634 A | 12/2000 |

OTHER PUBLICATIONS

International Search Report to PCT/IB 03/01113.

* cited by examiner

*Primary Examiner*—Robert H. Spitzer
(74) *Attorney, Agent, or Firm*—Elwood L. Haynes

(57) ABSTRACT

Gas separation membranes formed from polyester-polyether block copolymers which are useful for separating gases from gas mixtures. The membranes and processes are especially suited for separating polar gases from mixtures that contain polar and non-polar species. The novel membranes exhibit good permeability and permselectivity as well as durability, making them well suited for industrial applications such as removal of acid gases from natural gas and removal of carbon dioxide from synthesis gas.

49 Claims, No Drawings

BLOCK POLYESTER-ETHER GAS SEPARATION MEMBRANES

RELATED APPLICATIONS

This application claims priority from U.S. Provisional Application No. 60/368,471 filed Mar. 28, 2002.

FIELD OF THE INVENTION

This invention relates to membranes and processes for separating or concentrating gas mixtures, especially mixtures containing at least one polar gas such as carbon dioxide, hydrogen sulfide, sulfur dioxide, or water from at least one non-polar gas such as helium, hydrogen, nitrogen, or hydrocarbons using a selectively permeable membrane. More specifically, it relates to novel polyester-polyether block copolymer gas separation membranes for separating gas mixtures.

The polyester-polyether block copolymers contain alternating polyether (PE) soft segments and polyester hard segments. These block copolymers exhibit excellent gas separation properties especially for the separation of gas mixtures containing carbon dioxide and hydrogen, carbon dioxide and methane, or carbon dioxide and nitrogen. The inventive membranes exhibit exceptionally good permeation rates with high selectivity.

BACKGROUND OF THE INVENTION

Permselective membranes for gas separation are known and used commercially in applications such as the production of oxygen-enriched air, production of nitrogen-enriched-air for inerting and blanketing, the upgrading of natural gas streams to pipeline quality specifications (e.g., removal of carbon dioxide, hydrogen sulfide, and nitrogen from raw natural gas), and the recovery of hydrogen from various petrochemical and oil refining streams (e.g., separation of hydrogen from methane, ethane, ethylene, or carbon monoxide). Preferred membranes for industrial gas separations exhibit a combination of high flux and high permselectivity. The permeability of a gas A, $P_A$ through a membrane is often expressed as $$P_A = D_A \times S_A$$

where $D_A$ is the effective diffusivity of the gas through the membrane material, and $S_A$ is the solubility coefficient of the gas in the material. The ideal selectivity of a membrane for component A relative to component B, $\alpha_{A/B}$, is the ratio of permeabilities of the two components:

$$\alpha_{A/B} = \frac{[P_A]}{[P_B]} = \frac{[D_A]}{[D_B]} \times \frac{[S_A]}{[S_B]}$$

where, $D_A/D_B$ is the diffusivity selectivity, which is the ratio of diffusion coefficients of components A and B. The ratio of solubility coefficients of components A and B, $S_A/S_B$, is the solubility selectivity. Solubility selectivity is controlled by the relative affinity of the gas molecules to the polymer of the membrane; whereas, diffusivity selectivity is governed primarily by the relative sizes of the gas molecules and the sieving ability of the polymer matrix.

Current membranes used for industrial gas separation and/or concentration are primarily based on stiff-chain, rigid, glassy materials. The diffusivity component of the gas tends to be the controlling factor, and the ability of gas molecules to permeate is very size dependent. In such membrane materials, smaller gas molecules such as helium and hydrogen are more permeable than larger molecules such as oxygen, nitrogen, and methane. For rubbery or elastomeric polymers, the polymer chains are more flexible and less discriminating by molecular size. Solubility effects generally dominate selectivity in these cases. Permeability for rubbery polymers is generally much greater than for glassy, more rigid polymers. Generally, an inverse relationship between gas permeation rate and selectivity has been observed with most polymeric membranes. This relationship is generally observed for all glassy high glass-transition temperature polymers and for rubbery polymers. Consequently, prior-art gas separation membranes tend to exhibit either high gas permeation rates at the sacrifice of high permselectivity or the inverse. It would be highly desirable for gas separation membranes to exhibit both high gas permeation rates and high permselectivity. Further, it is desirable for such materials to be easily fabricated into appropriate membrane structures.

An application where membranes have been used commercially is for the removal of carbon dioxide and acid gases from raw natural gas to achieve pipeline quality natural gas (essentially less than 2.5% carbon dioxide). The major component of raw natural gas is methane, with lesser amounts of carbon dioxide, hydrogen sulfide, sulfur oxides, higher hydrocarbons, water, and nitrogen. The nature and purity of the raw gas is dependent on geographic location, geological formation, production history of the well, and the like. The majority of substandard raw gas is purified or concentrated using chemical sorption systems, but these are costly to build, operate, and maintain. Membrane systems have had limited success in natural gas processing because of high plant investment (a reflection of low membrane permeability), high operating cost (a reflection of low carbon dioxide/methane selectivity), and poor membrane durability (a reflection of polar gas components in the raw gas). Another potential separation is the removal of carbon dioxide from synthesis gas streams, which typically contain hydrogen, carbon dioxide, carbon monoxide, methane and water. Currently, carbon dioxide is removed from synthesis gas by amine absorption, which is a costly and maintenance-intensive process. Existing membranes are permselective to hydrogen, and thus the hydrogen product is obtained at low pressure. It would be highly desirable to maintain the hydrogen at high pressure, which would require a membrane that is permselective to carbon dioxide. The development of a membrane with high carbon dioxide permeability and high carbon dioxide/hydrogen selectivity could significantly reduce the cost of synthesis gas production. There is relatively little prior art regarding permselective polymeric membranes for separating polar gases from non-polar gases. U.S. Pat. No. 5,611,843 discloses a composition suitable for separating gas streams containing carbon dioxide, especially hydrogen rich gas streams containing carbon dioxide and carbon monoxide. The composition comprises a hydrophilic polymer and at least one salt of an amino acid, the salt of the amino acid being present in an amount ranging from about 10 to about 80 wt % based on the total weight of the composition. The polymers disclosed have to be hydrophilic polymers such as polyvinyl alcohol, polyvinyl acetate, and polyethylene oxide.

Okamoto et al. (Macromolecules, 1995, 28, 6950) reports permeation properties of poly(ether imide) segmented block copolymers for polar/nonpolar gas separations. These polymers consist of hard, glassy polyimide domains and soft, rubbery polyether domains. The polymers have excellent combinations of carbon dioxide permeability and high carbon dioxide/nitrogen separation factors. No data is reported for carbon dioxide/hydrogen separations. Bondar et. al. (Journal of Poly Sci.: Part B, 1999, 37, 2463) shows the gas sorption properties for a family of polyamide-polyether phase separated block copolymers. The gas sorption properties suggest strong favorable interactions between carbon dioxide and the polar linkages in the material, which results in very high carbon dioxide/non-polar gas solubility selectivity in these polymers. Only polyamide-polyether block copolymers are reported, specifically commercially available Pebax®.

U.S. Pat. No. 4,963,165 discloses a composite membrane made from a polyamide-polyether block copolymer useful in separating polar gases from non-polar gases. The polymers consist of a saturated aliphatic polyamide hard segment and a polyether soft segment. Only polyamide-polyether block copolymers are reported, specifically commercially available Pebax®. The membranes of this invention are rubbery in nature and as such exhibit high permeability coefficients, but have low ability to separate gases based on molecular size. However, they exhibit extremely high solubility coefficients for polar gases (e.g., carbon dioxide, hydrogen sulfide, sulfur dioxide, water) and low solubility coefficients for non-polar gases (e.g., helium, hydrogen, nitrogen, methane), and as such offer high solubility selectivity. Thus, the membranes of this invention offer both high permeability and high permselectivity for polar gases. Thus, they are well suited for separation of polar gases from commercial gas mixtures. They are especially suited, without limitation, for removal of polar components from natural gas, and separation of carbon dioxide from synthesis gas.

DETAILED DESCRIPTION OF THE INVENTION

This invention is directed to novel membranes made from polyester-polyether block copolymers. The invention is also directed at process for separating one or more polar gases from a gaseous mixture using such membranes. The polyester-polyether block copolymers are produced by reacting at least one polyether glycol, at least one aliphatic diol, and at least one dicarboxylic ester in the presence of a catalyst. The resulting polymers contain polyether soft segments and polyester hard segments.

Embodiments of this invention are directed to membranes made from certain polyester-polyether block copolymers that exhibit a unique combination of both high permeability and high permselectivity for the separation of various gas mixtures. Another aspect of this invention is directed to the separation of gases using said block copolymers. The block copolymers are produced by reacting at least one hydroxyl terminated polyether glycol, an excess of at least one aliphatic diol, and at least one dicarboxylic ester of an aromatic or aliphatic diacid in the presence of a catalyst at 150–260C. The resulting polymers contain segments (noted as "I") that are soft (noted as "s") comprising polyether soft segments (noted as "$I_s$") and hard (noted as "h") comprising polyester hard segments (noted as "$I_h$"). Depending on the chemical components, glycol excess, catalyst, and temperature, the polymerization is complete within about 4–8 hours. Preferably this process is carried out at ambient pressure, but it may also be conducted at other pressures known to one skilled in the art for polymerization. Preferred catalysts are organo titanates, such as tetrabutyl titanate, but other catalysts known to one skilled in the art may be used.

The synthesized or resultant block copolymers are represented by the repeating units of formulas ($I_s$) and ($I_h$):

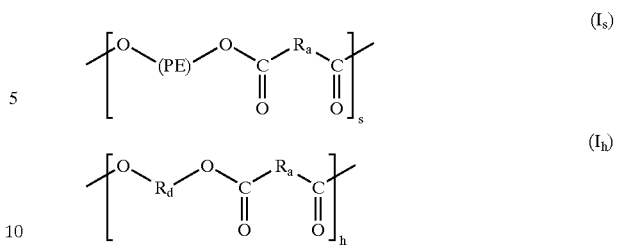

in which $R_a$ of ($I_s$) and ($I_h$) is an aliphatic or aromatic radical of about at least 2–18 carbon atoms; (PE) of ($I_s$) is a polyether segment having a number average molecular weight, $M_n$ (which is essentially equivalent to $M_n$ of the repeating formula ($I_s$)), ranging from about 600 to 8000, and preferably about 1000 to 4000; and $R_d$ of ($I_h$) is at least one linear or branched aliphatic radical of about at least 2–18 carbon atoms. Within the block copolymer, the number of carbon atoms in the repeating units may vary and there may be varieties and combinations of numbers of carbon atoms therein. The average molecular weight of the repeating formula ($I_h$) is preferably in the range of about 200 to 3000, and more preferably about 200–1000. In a preferred embodiment of the invention, $R_a$ is a moiety of composition selected from the group consisting or comprising formulas (S), (T), (U), (V), (W), (X), or (Y) below, or a combination or mixture thereof:

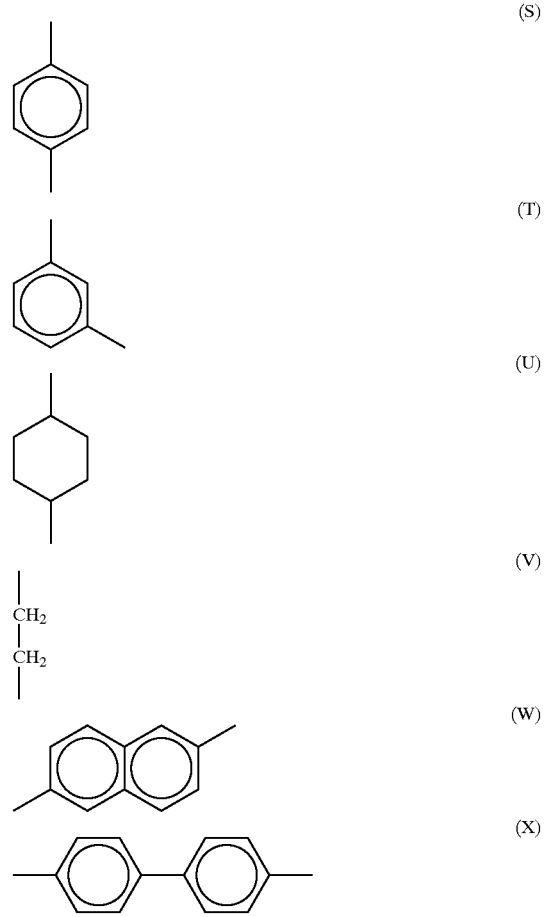

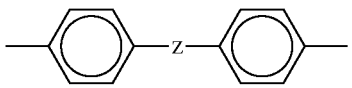 (Y)

Further, where formula (Y) is present or included, the —Z— in formula (Y) is a moiety selected from the group comprising or consisting of formulas (A), (B), (C), or (D), below, or a mixture or combination thereof.

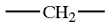 (A)

 (B)

 (C)

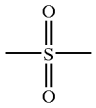 (D)

It has been discovered that the oxygen content and molecular weight of the polyether glycol affect permeation properties of the resulting block copolymers. Thus, the polyether segment, (PE), is derived preferably from a polyether glycol of number average molecular weight of about 600–8000, and more preferably about 1000–4000, and preferably an oxygen/carbon ratio of about 0.2–0.5. Preferred polyether glycols are hydroxyl terminated polyethylene glycol, hydroxyl terminated 1,2-polypropylene glycol, and hydroxyl terminated 1,4-polybutylene glycol, although other glycols known or used by one skilled in the art may be used. The hard segment of the block copolymer is derived from the condensation polymerization of at least one ester of an aromatic or aliphatic diacid with at least one aliphatic diol. The moiety $R_d$ of formula ($I_h$) is a derivative of the aliphatic diol. Preferred diols contain at least about 2–18 carbon atoms and can be linear and/or branched. Most preferred are diols containing between about 2–6 carbon atoms. Typical diols are ethylene glycol, 1,3-propanediol, 1,2-propanediol, 1,4-butanediol, and 1,6-hexanediol, although other diols known or used by one skilled in the art may be used. Typically, the polymers of this invention exhibit a number average molecular weight in the range from about 23,000 to 400,000 and preferably about 50,000–280,000. As shown from the variety of combinations of components, a variety of types of polyester-polyether block copolymers are contemplated and disclosed herein.

It has also been discovered that the ratio of soft segment to hard segment of these block copolymers is critical to gas separation properties of the polymer and the ability to fabricate the polymers into suitable membranes. Preferably, the soft segment comprises about 50–90 weight % of the polymer weight, and most preferably, about 60–85%. These block copolymers exhibit superior permeability and permselectivity with respect to several gaseous mixtures and particularly with respect to separating polar gases from non-polar gases. They are especially suited, without limitation, for removal of polar components from natural gas, and separation of carbon dioxide from synthesis gas. Gas separation membranes prepared from such block polymers possess an excellent balance of gas permeation rate and permselectivity for one gas over other gases in a multi-component gas mixture. It has been discovered that the membranes of this invention exhibit extremely high permeability for polar gases, and excellent permselectivity versus non-polar gases. Thus, these membranes are ideally suited for the separation of polar gases, such as carbon dioxide, hydrogen sulfide, and sulfur dioxide from non-polar gases, such as helium, hydrogen, nitrogen, oxygen, and methane. Since the separation of carbon dioxide from hydrogen is a difficult separation with high industrial significance, it was chosen to demonstrate the utility of the membranes of this invention. It was found that the polyester-ether membranes exhibit both superior carbon dioxide permeability and carbon dioxide/hydrogen selectivity than prior art polymers, thus clearly differentiating them from the prior art.

The high gas permeability of these membranes is believed to be due to the propensity of the polyether soft segment to absorb high amounts of the more permeable gas. The high selectivity of these membranes is believed to be due to the interactions between the semi-crystalline polyester hard segments and the polyether soft segments. The preferred polyester-polyether block copolymers are insoluble or only slightly soluble in most common solvents. Suitable solutions for membrane fabrication can be made using highly polar solvents such as N-methyl-2-pyrrolidone, N,N-dimethylacetamide, m-cresol and the like, although other highly polar solvents known or used by one skilled in the art may be used. Alternatively, membranes in accordance with this invention can be melt-processed at elevated temperatures, generally above about 200° C. The polymer can be formed into films or hollow fiber membranes by any of the diverse techniques known to one skilled in the art. A preferred form of the membrane is a composite structure comprising a non-selective microporous support layer coated with a thin layer of the block copolymer to provide the separation function. Typically, the support layer of such a composite membrane is made by solution-casting a film or spinning a hollow fiber. The selective layer is usually solution coated on the support in a separate step. Alternatively, hollow-fiber composite membranes can be made by co-extrusion of both the support material and the separating layer simultaneously as described in U.S. Pat. No. 5,085,676.

The membranes of the invention may be housed in any convenient type of separation unit. For example, flat-sheet membranes can be stacked in plate-and-frame modules or wound in spiral-wound modules. Hollow-fiber membranes are typically potted with a thermoset resin in cylindrical housings. The final membrane separation unit can comprise one or more membrane modules. These can be housed individually in pressure vessels or multiple modules can be mounted together in a common housing of appropriate diameter and length.

In operation, a mixture of gases is contacted with one side of the membrane. Under a suitable driving force for permeation, such as imposing a pressure difference between the feed and permeate sides of the membrane, one gas, usually called the "fast" gas, passes to the permeate side at higher rate than other gases in the mixture. This produces a "fast" gas-enriched or concentrated stream which is withdrawn from the permeate side of the membrane. The "fast" gas-depleted residue, occasionally referred to as the "retentate", is withdrawn from the feed side.

The membranes of this invention are particularly suited for separating polar gases from non-polar gases. That is, the polar gases permeate faster than the non-polar gases. For example, the membranes of this invention are well suited for separating carbon dioxide (polar gas) from hydrogen, or carbon dioxide from methane or nitrogen. Thus a gas mixture that contains carbon dioxide and hydrogen can be separated into a carbon dioxide-rich stream, and a carbon dioxide-depleted stream. The carbon dioxide-rich stream, often referred to as the "permeate", is collected at lower pressure on the permeate side of the membrane, and the carbon dioxide-depleted stream, occasionally referred to as the "retentate", is withdrawn from the feed side.

The novel process can operate under a wide range of conditions and is thus adapted to accept a feed stream supplied from diverse sources. If the feed stream is a gas that exists already at a sufficiently high, above-atmospheric pressure and a pressure gradient is maintained across the membrane, the driving force for separation can be adequate without raising feed stream pressure farther. Otherwise, the feed stream can be compressed to a higher pressure and/or a vacuum can be drawn on the permeate side of the membrane to provide adequate driving force. Preferably the driving force for separation should be a pressure gradient across the membrane of about 0.7 to about 11.0 MPa (100–1600 psi).

The fundamental steps of the separation process include a) providing a two-sided, selective permeable membrane comprising a block copolymer having the repeating units of formulae $(I_s)$ and $(I_h)$, b) contacting a first side of the membrane with a feed gas mixture, c) causing the component gases of the feed mixture to selectively permeate through the membrane, thereby forming on the second side of the membrane a permeate composition which has a greater concentration of a more permeable species than that of the feed mixture, d) removing from the second side of the membrane a permeate composition enriched in the more permeable species, and e) withdrawing from the first side of the membrane a gas composition depleted in the more permeable species.

This invention is now illustrated by examples of certain representative embodiments thereof, wherein all parts, proportions and percentages are by weight unless otherwise indicated. All units of weight and measure not originally obtained in SI units have been converted to SI units.

EXAMPLES

General Procedure for Polymer Synthesis

A flame-dried 500 mL resin kettle, equipped with a mechanical stirrer, a distillation head, and a nitrogen inlet, was charged with a dimethylester of the dicarboxylic acid, the polyether soft segment, an excess of the aliphatic diol, Irganox 330 (antioxidant), and Tyzor TBT catalyst. The flask was evacuated and refilled with nitrogen three times to create an inert and dry atmosphere. The mixture was gradually heated to 240–250° C. and stirred under a nitrogen atmosphere for approximately 4 hours. A vacuum was then applied and the reaction was heated for an additional 3–4 hours until the mixture became viscous. The reaction mixture was then poured into an aluminum pan and allowed to cool to room temperature.

A film was solution cast from a solvent such as N-methyl-2-pyrrolidone ("NMP") or m-cresol, or melt-pressed. For the solution cast method, a 20% (by weight) polymer solution was cast onto a glass plate that has been preheated to around 80–100° C. The film is kept of the plate for 12–18 hours to ensure the removal of most of the solvent. After removing the film from the glass plate, the film is further dried in a vacuum oven at 80° C. under a nitrogen atmosphere for 3 days.

For the melt pressed film, the polymer is pressed at an elevated temperature (generally around 200° C.) in a melt-press at about 5000 psi using a 0.10 mm (4 mil) template. The material is maintained at the elevated temperature for 1–2 minutes, and then allowed to gradually cool in the press. The film is then removed from the template. The film of thickness of 0.10–0.12 mm (4–5 mils) was tested for pure or mixed gas permeabilities at 500 psig ($34.5\times10^{-5}$ Pa), at 25° C. However, the gas permeabilities could also be tested at other suitable temperatures and/or pressures. Typically, the membranes are used to separating gases which are at about 0° C. to about 120° C. Additionally, the membranes of this invention may vary in thickness and can be of about 0.00005 mm about 0.30 mm or of other thickness known or used by one skilled in the art.

Procedure for Carbon Dioxide/Hydrogen Single-Gas Permeation Measurements

A sample disk of 47 mm diameter was cut from a sheet of polymer film (generally 0.05 to 0.30 mm thick) and placed in a 47-mm ultrafiltration permeation cell (Millipore) modified for gas permeation measurement. Permeation measurements were conducted by placing the cell in an oven maintained at 35° C. Hydrogen, at a pressure of 1.5 MPa (200 psig), followed by carbon dioxide at (1.5 MPa) was introduced into the cell, in that order. The permeate pressure was maintained at 4–20 mmHg. The permeate flowrate was determined from the rate of increase in pressure over time in the fixed-volume permeate chamber of the permeation cell with a Baratron pressure sensor.

The permeation performance of the polymer was characterized in terms of carbon dioxide permeability and carbon dioxide/hydrogen permselectivity. The permeability is the permeate flowrate normalized by the film surface area and the film thickness and by the pressure difference across the film. Units of permeability are Barrers. One Barrer is $10^{-10}$ $cm^3$ (STP)·cm/(sec·cm²·cm Hg). The carbon dioxide/hydrogen permselectivity is the ratio of the carbon dioxide and hydrogen permeabilities.

Procedure for Carbon Dioxide/Hydrogen Mixed-gas Permeation Measurements

A sample disk of 47 mm diameter was cut from a sheet of polymer film (generally 0.050 to 0.30 mm thick) and placed in a 47-mm ultrafiltration permeation cell (Millipore) modified for gas permeation measurement. The cell was equipped with ports for a feed stream and a retentate stream on the upstream side of the sample disk and for a permeate stream on the downstream side of the sample disk. Permeation measurements were conducted by placing the cell in an oven maintained at 35° C. A feed gas mixture of 20% carbon dioxide in hydrogen was provided as the feed stream at a pressure of 1.5 MPa (200 psig). The feed flowrate was set high enough to ensure less than 1% conversion of the feed into permeate. The permeate pressure was 4–20 mmHg.

The composition of the feed and permeate streams was measured by gas chromatography with a thermal conductivity detector and high-purity nitrogen as carrier gas. The permeate composition was in the range 20 to 80% carbon dioxide. The permeate flowrate was determined from the rate of increase in pressure over time in the fixed-volume permeate chamber of the permeation cell with a Baratron pressure sensor. The permeation performance of the polymer was characterized in terms of carbon dioxide permeability and carbon dioxide/hydrogen permselectivity. The carbon dioxide permeability is the flowrate of carbon dioxide across the film normalized by the film surface area and film thickness and by the carbon dioxide partial pressure difference across the film. Units of permeability are Barrers. One Barrer equals $10^{-10}$ cm$^3$ (STP)·cm/(sec·cm$^2$·cm Hg). The carbon dioxide/hydrogen permselectivity is simply the ratio of the carbon dioxide and hydrogen permeabilities.

Comparative Example 1

A film PEBAX MH1657, a polyether-block co-polyamide polymer from Atofina Chemicals, Inc, 2000 Market Street, Philadelphia, Pa., 19103, was melt pressed at 250° C. at 5000 psig using a 3-mil template (~3.0 g of polymer). The sample was maintained at 250° C. for 1 minute at pressure, then allowed to cool to 10° C. A disk of the film was tested for gas permeation properties as described above.

Single gas permeation results:

| | |
|---|---|
| Permeability in Barrers: | 147 |
| Carbon dioxide/hydrogen selectivity: | 7.5 |
| Mixed gas permeation results: | |
| Permeability in Barrers: | 101 |
| Carbon dioxide/hydrogen selectivity: | 5.1 |

Example 1

A flame-dried 100 mL resin kettle, equipped with a mechanical stirrer, Dean-Stark trap, and a nitrogen inlet, was charged with 18.02 g (0.20 mol) of 4G (1,4-butanediol), 14.56 g (0.075 mol) of DMT (dimethyl terephthalate), 4.85 g (0.025 mol) of DMI (dimethyl isophthalate), 60.00 g (0.040 mol) of PEG-1500 (hydroxyl terminated polyethylene glycol, MW~1500), 0.30 g of Irganox 330, and 1.5 g Tyzor TBT®. The flask was evacuated and refilled with nitrogen three times to create an inert atmosphere prior to heating. The mixture was then gradually heated to 240–250° C. and stirred under a nitrogen atmosphere for about 4 hours. A vacuum was then gradually applied and the reaction was heated for an additional 1–2 hours under vacuum until the mixture became viscous. During this time, the reaction temperature was allowed to reach 245° C. The reaction mixture was cooled to room temperature, and the polymer was removed from the reaction flask. The polymer had an inherent viscosity of 1.71 dL/g (in m-cresol).

A film was melt pressed at 250° C. at 5000 psig using a 3-mil template (~3.0 g of polymer). The sample was maintained at 250° C. for 1 minute at pressure, then allowed to cool to 10° C. A disk of the film was tested for gas permeation properties. Results are reported in Table 1.

Examples 2–10

Various polymers were made using the ingredients depicted in Table 1 utilizing the synthesis techniques of Example 1. Dense films were either cast from solution or melt pressed to form films for permeation testing. Gas permeation results are shown in Table 1.

TABLE 1

| Example # | Diol | Polyether | Diester | Wt % SS | $P_{(CO2)}$ (Ba) | $P_{(H2)}$ (Ba) | $P_{(CO2)}/P_{(H2)}$ | Temp (° C.) |
|---|---|---|---|---|---|---|---|---|
| 1 | A | PEG-1500 | S/T (3:1) | 77 | 342 | 27.0 | 12.63 | 33.5 |
| 2 | A | PEG-1500 | S | 75 | 224 | 16.8 | 13.31 | 20 |
| 2A* | A | PEG-1500 | S | 75 | 230 | | 8.2 | 35 |
| 3 | A | PEG-1500 | S | 65 | 262 | 28.2 | 9.31 | 35 |
| 4 | A | PEG-1500 | W | 78 | 333 | 30.6 | 10.87 | 33 |
| 5 | B | PEG-1500 | U | 77 | 353 | 35.8 | 9.86 | 33.5 |
| 6 | B | PEG-1500 | Y | 76 | 237 | 23.1 | 10.26 | 36 |
| 7 | B | PEG-1500 | X | 75 | 322 | 45.3 | 7.12 | 33 |
| 8 | C | PEG-2000 | W | 73 | 59.3 | 5.6 | 10.57 | 33 |
| 9 | A | Ter 2900 | S | 71 | 319 | 48 | 6.65 | 25 |
| 10* | A | PEG-1500 | V | 78 | 241 | | 8.0 | 35 |

Note:
All gas testing results are by the single gas test method unless the example number is designated with an *, in which case the mixed gas test was used.
Glossary:
A = 1,4-butanediol
B = 1,3-propanediol
C = 1,2-ethyleneglycol
S = dimethylterephthalate (DMT)
T = dimethylisophthalate (DMI)
W = dimethyl 2,6-naphthalenedicarboxylate (2,6-DMN)
U = dimethyl 1,4-cyclohexanedicarboxylate DMCH)
Y = 4,4'-sulfonylbis(methylbenzoate) (SBMB)
X = dimethyl 4,4'-biphenyldicarboxylate (DMBPD)
V = dimethylsuccinate, DBE-4 dibasic ester (DBE-4)
PEG-1500 = hydroxyl terminated polyethylene glycol, MW~1500
PEG-2000 = hydroxyl terminated polyethylene glycol, MW~2000
Ter 2900 = Terathane 2900 (hydroxyl terminated polybutylene glycol, MW~2900

It is clear from the above examples that the polyester-ether membranes of this invention exhibit both superior carbon dioxide permeability and carbon dioxide/hydrogen selectivity than prior art polymers, thus clearly differentiating them from the prior art.

Although specific forms of the invention have been selected for illustration in the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims.

What is claimed is:

1. A process for separating component gases of a gas mixture comprising the steps of:
   a) providing a permeable membrane comprising a polyester-polyether block copolymer comprising repeating units of a polymer soft segment of formula ($I_s$) and a polymer hard segment of formula ($I_h$):

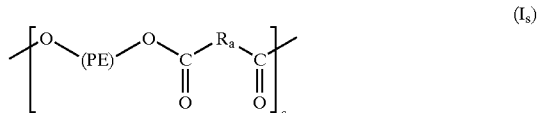

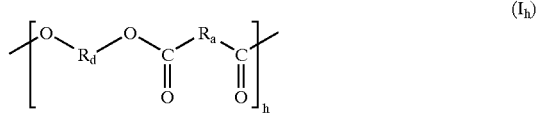

wherein $R_a$ is an aliphatic or aromatic radical;
s denotes soft;
h denotes hard;

(PE) is a polyether segment;

and $R_d$ is a linear or branched aliphatic radical;

b) contacting a first side of the membrane with a feed gas mixture; and c) causing a component of said feed gas mixture to selectively permeate through said permeable membrane, thereby forming on a second side of the membrane a permeate composition which has a greater concentration of said component than that of said feed mixture.

2. The process of claim 1, further comprising the step of removing from said second side of the membrane said permeate composition.

3. The process of claim 2, further comprising the step of withdrawing from said first side of the membrane a gas composition depleted in said component.

4. The process of claim 1, wherein $R_a$ is at least one aliphatic or aromatic radical comprising at least about 2–18 carbon atoms.

5. The process of claim 4, wherein $R_a$ is selected from the group of molecular structures consisting of the formulas:

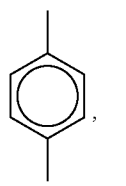 (S)

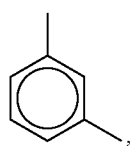 (T)

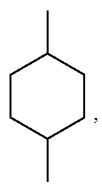 (U)

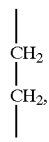 (V)

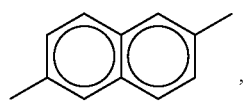 (W)

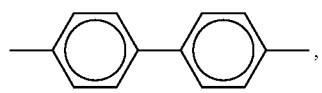 (X)

and

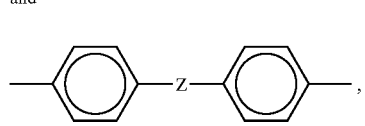 (Y)

wherein —Z— is a composition selected from the group of molecular structures consisting of the formulas:

and mixtures thereof.

6. The membrane of claim 5, wherein at least the molecular structure of formula (Y) is present.

7. The process of claim 1, wherein said polyether segment has a number average molecular weight, $M_n$, ranging from at least about 600 to 8000.

8. The process of claim 1, wherein $R_d$ is a linear or branched aliphatic radical comprising at least about 2–18 carbon atoms.

9. The process of claim 1, wherein the number average molecular weight of said polymer hard segment ($I_h$) is in the range of about 200 to 3000.

10. The process of claim 1, wherein said polyester-polyether block copolymer exhibits a number average molecular weight in the range from about 23,000 to 400,000.

11. The process of claim 1, wherein an oxygen to carbon ratio of said polyether segment is about 0.2–0.5.

12. The process of claim 1, wherein said polyether segment is derived from a polyether glycol selected from a group consisting of hydroxyl terminated polyethylene glycol, hydroxyl terminated 1,2-polypropylene glycol, hydroxyl terminated 1,4-polybutylene glycol, and mixtures thereof.

13. The process of claim 1, wherein $R_d$ is derived from a linear or branched aliphatic diol comprising at least about 2–18 carbon atoms.

14. The process of claim 13, wherein said branched aliphatic diol is selected from the group consisting of ethylene glycol, 1,3-propanediol, 1,2-propanediol, 1,4-butanediol, 1,6-hexanediol, and mixtures thereof.

15. The process of claim 1, wherein said polymer soft segment ($I_s$) comprises about 50–90 weight % of said polyester-polyether block copolymer.

16. The process of claim 1, wherein said component comprises a polar gas.

17. The process of claim 16, wherein said polar gas is selected from the group consisting of carbon dioxide, hydrogen sulfide, sulfur dioxide, water, and mixtures thereof.

18. The process of claim 16, wherein the solubility of said component in said polyester-polyether block copolymer is controlled by the relative affinity of a molecule of said component to said polyester-polyether block copolymer.

19. The process of claim 16, wherein said polar gas is separated at temperatures of about 0° C. to about 120° C.

20. The process of claim 1, wherein said permeable membrane has a thickness of about 0.00005 mm to about 0.30 mm.

21. The process of claim 20, wherein said permeable membrane further comprises a non-selective microporous support.

22. The process of claim 21, wherein said permeable membrane comprises flat-sheet membranes stacked in plate-and-frame modules or wound in spiral-wound modules.

23. The process of claim 20, further comprising a membrane module.

24. The process of claim 23, wherein each said membrane module is housed individually in a separate pressure vessel or wherein multiple said membrane modules are mounted together in a common housing.

25. The process of claim 1, wherein a pressure gradient across said permeable membrane is about 0.7 to about 11 MPa during gas separation.

26. A permeable membrane for separating and/or concentrating gases comprising:

a permeable membrane comprising a polyester-polyether block copolymer, wherein said polyester-polyether block copolymer comprises repeating units of a polymer soft segment of formula ($I_s$) and a polymer hard segment of formula ($I_h$):

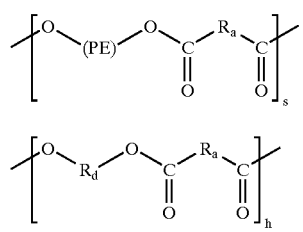

wherein $R_a$ is an aliphatic or aromatic radical;

s denotes soft;

h denotes hard;

(PE) is a polyether segment; and $R_d$ is a linear or branched aliphatic radical.

27. The membrane of claim 26, wherein $R_a$ is at least one aliphatic or aromatic radical comprising at least about 2–18 carbon atoms.

28. The membrane of claim 27, wherein $R_a$ is selected from the group of molecular structures consisting of the formulas:

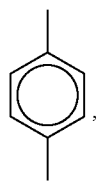 (S)

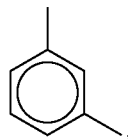 (T)

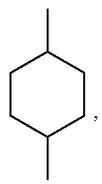 (U)

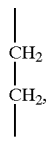 (V)

 (W)

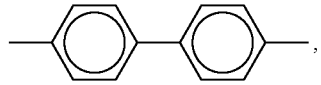 (X)

and

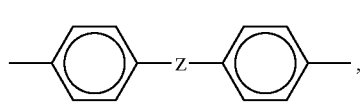 (Y)

wherein —Z— further comprises a molecular structure selected from the group of molecular structures consisting of formulas:

 (A)

 (B)

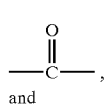 (C)

and

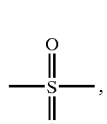 (D)

and mixtures thereof.

29. The membrane of claim 28, wherein at least the molecular structure of formula (Y) is present.

30. The membrane of claim 26, wherein said polyether segment has a number average molecular weight, $M_n$, ranging from about 600 to 8000.

31. The membrane of claim 26, wherein $R_d$ is at least one linear or branched aliphatic radical comprising at least about 2–18 carbon atoms.

32. The membrane of claim 26, wherein the number average molecular weight of said polymer hard segment ($I_h$) is in the range of about 200 to 3000.

33. The membrane of claim 26, wherein said polyester-polyether block copolymer exhibits a number average molecular weight in the range from about 23,000 to 400,000.

34. The membrane of claim 26, wherein an oxygen to carbon ratio of said polyether segment is about 0.2–0.5.

35. The membrane of claim 26, wherein said polyether segment is derived from a polyether glycol selected from the group consisting of hydroxyl terminated polyethylene glycol, hydroxyl terminated 1,2-polypropylene glycol, hydroxyl terminated 1,4-polybutylene glycol, and mixtures thereof.

36. The membrane of claim 26, wherein $R_d$ is derived from a linear or branched aliphatic diol containing about 2–18 carbon atoms.

37. The membrane of claim 36, wherein said linear or branched aliphatic diol is selected from the group consisting of ethylene glycol, 1,3-propanediol, 1,2-propanediol, 1,4-butanediol, 1,6-hexanediol, and mixtures thereof.

38. The membrane of claim 26, having a thickness of about 0.00005_ mm to about 0.30_ mm.

39. The membrane of claim 26, wherein said polymer soft segment ($I_s$) comprises about 50–90 weight % of said polyester-polyether block copolymer.

40. A block copolymer membrane for separating and/or concentrating gases comprising:

a permeable membrane comprising a polyester-polyether block copolymer, wherein said polyester-polyether block copolymer comprises repeating units of polymer soft segments of formula ($I_s$) and polymer hard segments of formula ($I_h$):

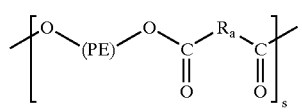
(I_s)

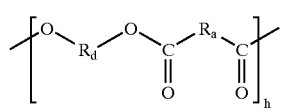
(I_h)

wherein $R_a$ of formulae ($I_s$) and ($I_h$) is an aliphatic or aromatic radical;

s denotes soft;

h denotes hard;

(PE) is a polyether segment;

$R_d$ of formula ($I_h$) is a linear or branched aliphatic radical.

41. The membrane of claim 40, wherein $R_a$ comprises an aliphatic or aromatic radical comprising at least about 2–18 carbon atoms and/or wherein $R_d$ comprises a linear or branched aliphatic radical comprising at least about 2–18 carbon atoms.

42. The membrane of claim 40, wherein said polyester-polyether block copolymer exhibits a number average molecular weight in the range from about 23,000 to 400,000.

43. The membrane of claim 40, wherein said polyether segment is derived from a polyether glycol and wherein said polyether segment has a number average molecular weight, $M_n$, ranging from about 600 to 8000.

44. The membrane of claim 40, wherein the number average molecular weight of said polymer hard segment ($I_h$) is in the range of about 200 to 3000 and wherein said polymer soft segment ($I_s$) comprises about 50–90 weight % of said polyester-polyether block copolymer.

45. The membrane of claim 40, wherein $R_a$ is selected from the group of molecular structures consisting of the formulas:

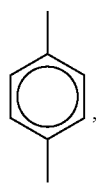
(S)

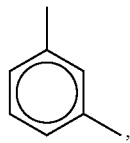
(T)

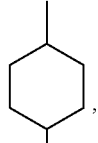
(U)

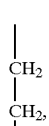
(V)

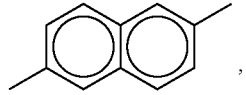
(W)

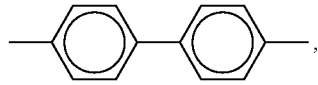
(X)

and

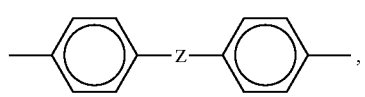
(Y)

and wherein —Z— is selected from the group of molecular structures consisting of the formulas:

(A)

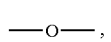
(B)

(C)

and

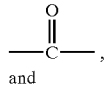
(D)

and mixtures thereof.

46. The membrane of claim 45, wherein at least the molecular structure of formula (Y) is present.

47. The membrane of claim 40, wherein $R_d$ is derived from a linear or branched aliphatic diol containing about 2–18 carbon atoms and/or wherein said diol is selected from the group consisting of ethylene glycol, 1,3-propanediol, 1,2-propanediol, 1,4-butanediol, 1,6-hexanediol, and mixtures thereof.

48. The membrane of claim 40, having a thickness of about 0.00005 mm to about 0.30 mm.

49. The membrane of claim 48, further comprising a non-selective microporous support.

* * * * *